United States Patent [19]
Tanaka et al.

[11] Patent Number: 5,164,821
[45] Date of Patent: Nov. 17, 1992

[54] IMAGE PROJECTION SYSTEM

[75] Inventors: Takaaki Tanaka, Katano; Yoshito Miyatake, Neyagawa, both of Japan

[73] Assignee: Matsushita Electric Industrial Co., Ltd., Osaka, Japan

[21] Appl. No.: 760,355

[22] Filed: Sep. 16, 1991

[30] Foreign Application Priority Data

Sep. 21, 1990 [JP] Japan .................. 2-253251

[51] Int. Cl.⁵ ............................ H04N 9/31
[52] U.S. Cl. ............................ 358/61; 358/232
[58] Field of Search ............ 358/60, 61, 232, 236

[56] References Cited

U.S. PATENT DOCUMENTS 4,989,076 1/1991 Owada .................. 358/61

FOREIGN PATENT DOCUMENTS 2-250026 5/1990 Japan .

OTHER PUBLICATIONS

Institute of Television Engineers of Japan Technical Report, CE '89-17, pp. 55-60.

Primary Examiner—Howard W. Britton
Attorney, Agent, or Firm—Wenderoth, Lind & Ponack

[57] ABSTRACT

A projection system comprises a light source, a dichroic mirror for separating white light into blue, green and red color light beams, a halfwave plate for converting the direction of polarization, three light valves for forming optical images depending on a picture signal, and three projection lenses for projecting the optical images on the light valves onto a screen. By using the halfwave plate, the color light of p-polarized light component or s-polarized light component emitted from the dichroic mirror is entered into the liquid crystal panel. The gradient width of the spectral distribution of the color light entering the liquid crystal panel is smaller, and the color nonuniformity of projected image by changes of spectral transmittance characteristic of the dichroic mirror with respect to the incident angle is reduced.

15 Claims, 7 Drawing Sheets

IMAGE PROJECTION SYSTEM

BACKGROUND OF THE INVENTION

1. Field of the Invention

The present invention relates to an image projection system for illuminating an image formed on a light valve with light, and projecting the image on a screen by a projection lens.

2. Description of the Prior Art

To obtain a large picture, light is emitted from a light source to a light valve of a small size to form an optical image depending on the picture signal, and an enlargement of the optical image is projected on the screen by a projection lens. A projection system using a liquid crystal panel as the light valve is noticed. The conventional projection system (for example, as disclosed in the Institute of Television Engineers of Japan Technical Report, CE '89-17, pp. 55-60) comprised a lamp, a light collecting optical system for collecting the radiation light from the lamp, a color separation optical system composed of three dichroic mirrors, three field lenses, three active matrix liquid crystal panels, three projection lenses, and a screen. Because of the use of three projection lenses, the color combination optical means is not needed, and the projection lenses may be easily widened in angle. Therefore, a compact projection system is composed.

The light from the light source is a natural light, but the liquid crystal panel utilizes a linearly polarized light obtained through a polarizer. When the angle formed by the liquid crystal molecular alignment direction of the liquid crystal cell wall surface of the liquid crystal panel and the p-polarization direction of the dichroic mirror is about 45 degrees, the color light of the mean component of the p-polarization component and s-polarization component from the dichroic mirror enters the liquid crystal panel. Assuming the difference between the wavelength of 10% transmittance of the spectral transmittance characteristic of the dichroic mirror and the wavelength of 90% transmittance to be a gradient width, the gradient width of the mean component is greater than the gradient width of the spectral transmittance characteristic of the p-polarized and s-polarized light components. The greater the gradient width, the larger become the brightness and chromaticity changes with respect to changes of the spectral transmittance of the dichroic mirror due to incident angle dependence or film thickness unevenness. Besides, the color light of the mean component of the p-polarized and s-polarized light is larger in the change of the spectral transmittance characteristic of the dichroic mirror with respect to the incident angle, than the color light of the p-polarized or s-polarized light, and the color nonuniformity of the projected image becomes larger. If there is a slight fluctuation in the spectral transmittance characteristic of the dichroic mirror, the brightness and chromaticity of the projected image vary.

SUMMARY OF THE INVENTION

It is hence a primary object of the invention to present an image projection system free from color nonuniformity of projected image and easy in adjustment of color reproducing range.

In one aspect of the invention, an image projection system comprises a light source, color separation optical means for separating a light from the light source into color components of blue, green and red, three halfwave plates receiving exit light beams of blue, green and red from the color separation optical means for converting polarization directions of the exit light beams, three light valves receiving exit light beams from the halfwave plates for forming optical images corresponding to video signals, and three projection lenses for projecting on a screen exit light beams from the light valves to form an optical image on the screen.

In another aspect of the invention, an image projection system comprises a light source, color separation optical means for separating a light from the light source into color components of blue, green and red, three light valves receiving color light beams of blue, green and red from the color separation optical means for forming optical images corresponding to video signals, color combination optical means for combining color components of blue, green and red emitted from the light valves, a projection lens for projecting on a screen an exit light from the color combination optical means to form an optical image on the screen, and halfwave plates disposed between the color separation optical means and color combination optical means for converting polarization directions of the color light beams of blue, green and red.

In still another aspect of the invention, an image projection system comprises a light source, color separation optical means for separating a light from the light source into color components of blue, green and red, three field lenses each having a halfwave plate formed thereon for receiving blue, green and red color light beams from the color separation optical means, three light valves receiving exit light beams from the field lenses for forming optical images corresponding to video signals, a projection lens for projecting on a screen the optical images to form an optical image on the screen, and means for rotating the field lenses to adjust brightness and chromaticity of the projected image.

In the invention composed as described herein, by the halfwave plate, the color light of p-polarized or s-polarized light component entering from the color separation optical system enters the liquid crystal panel. The gradient width of the spectral distribution of the color light entering the liquid crystal panel becomes smaller, and the brightness and chromaticity changes corresponding to the changes of the spectral transmittance of the dichroic mirror due to incident angle dependence of film thickness unevenness can be made smaller. Besides, sharp separation or combination of color light can be realized. In addition, the color nonuniformity of the projected image due to changes in the spectral transmission characteristic of the dichroic mirror with respect to the incident angle can be reduced. By installing means for rotating the halfwave plates, the spectral distribution characteristic of the color light entering the liquid crystal panel can be controlled so that the brightness and chromaticity of the projected image are adjusted. Furthermore, because of the use of field lenses each having a halfwave plate formed thereon, the surface reflection loss on the boundary surface can be reduced, so that the total transmittance of the optical system can be enhanced.

DESCRIPTION OF THE PREFERRED EMBODIMENTS

Figure 1:
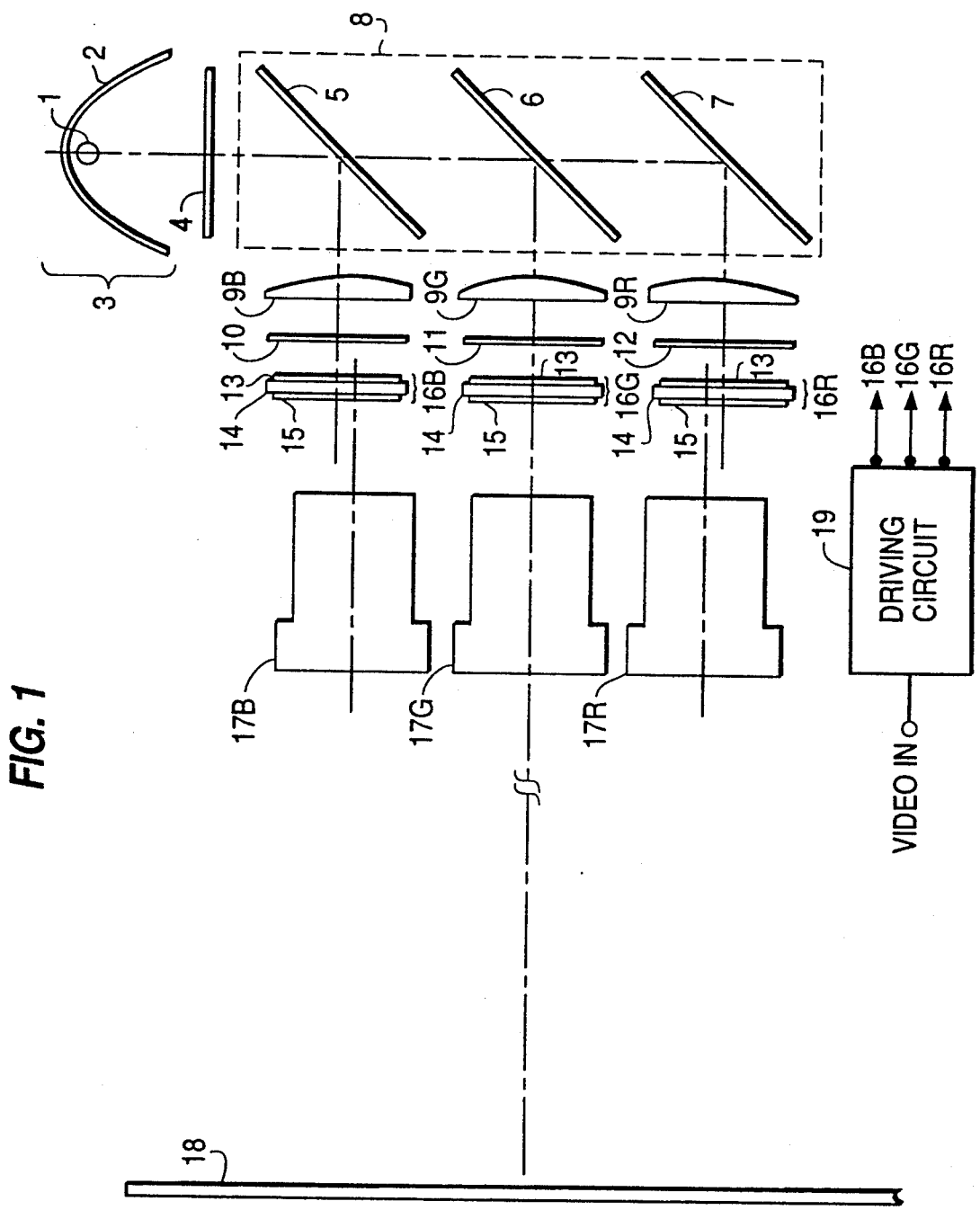
FIG. 1 is a configuration diagram of an image projection system in a first embodiment of the invention.

FIG. 1 shows a configuration of a first image projection system of the invention, in which liquid crystal panels are used as light valves. Numeral 1 is a lamp, 2 is a parabolic mirror, 3 is a light source composed of the lamp 1 and parabolic mirror 2, 4 is an ultraviolet ray, infrared ray cut filter, 5, 6, 7 are dichroic mirrors, 8 is color separation optical means composed of the dichroic mirrors, 9B, 9G, 9R are field lenses, 10, 11, 12 are halfwave plates, 13, 15 are polarizing plates, 14 is a liquid crystal cell having a switching element with each pixel, 16B, 16G, 16R are liquid crystal panels composed of the liquid crystal cell 14 and polarizing plates 13, 15, 17B, 17G, 17R are projection lenses, 18 is a screen, and 19 is a driving circuit.

The light emitted from the lamp 1 such as metal halide lamp, xenon lamp, halogen lamp or the like is converted into approximately parallel light by the parabolic mirror 2. The approximately parallel light beams from the light source 3 are fed into the ultraviolet ray, infrared ray cut filter 4 so that the ultraviolet ray and infrared lay may not be transmitted to the front surface, and enters the color separation optical means 8. The color separation optical means 8 separates the white color from the light source into blue, green and red color light beams by the dichroic mirror 5 for blue reflection, dichroic mirror 6 for green reflection, and dichroic mirror 7 for red reflection. The color light beams of blue, green and red separated by the color separation optical means 8 enter the field lenses 9B, 9G, 9R, respectively. The field lenses 9B, 9G, 9R are intended to enter the lights transmitting through the peripheral parts of the liquid cyrstal panels 16B, 16G, 16R into the projection lenses 17B, 17G, 17R, and they are plano-convex lenses having the plane sides directed to the respective liquid crystal panels 16B, 16G, 16R. The exit lights from the field lenses enters the halfwave plates 10, 11, 12.

Figure 2:
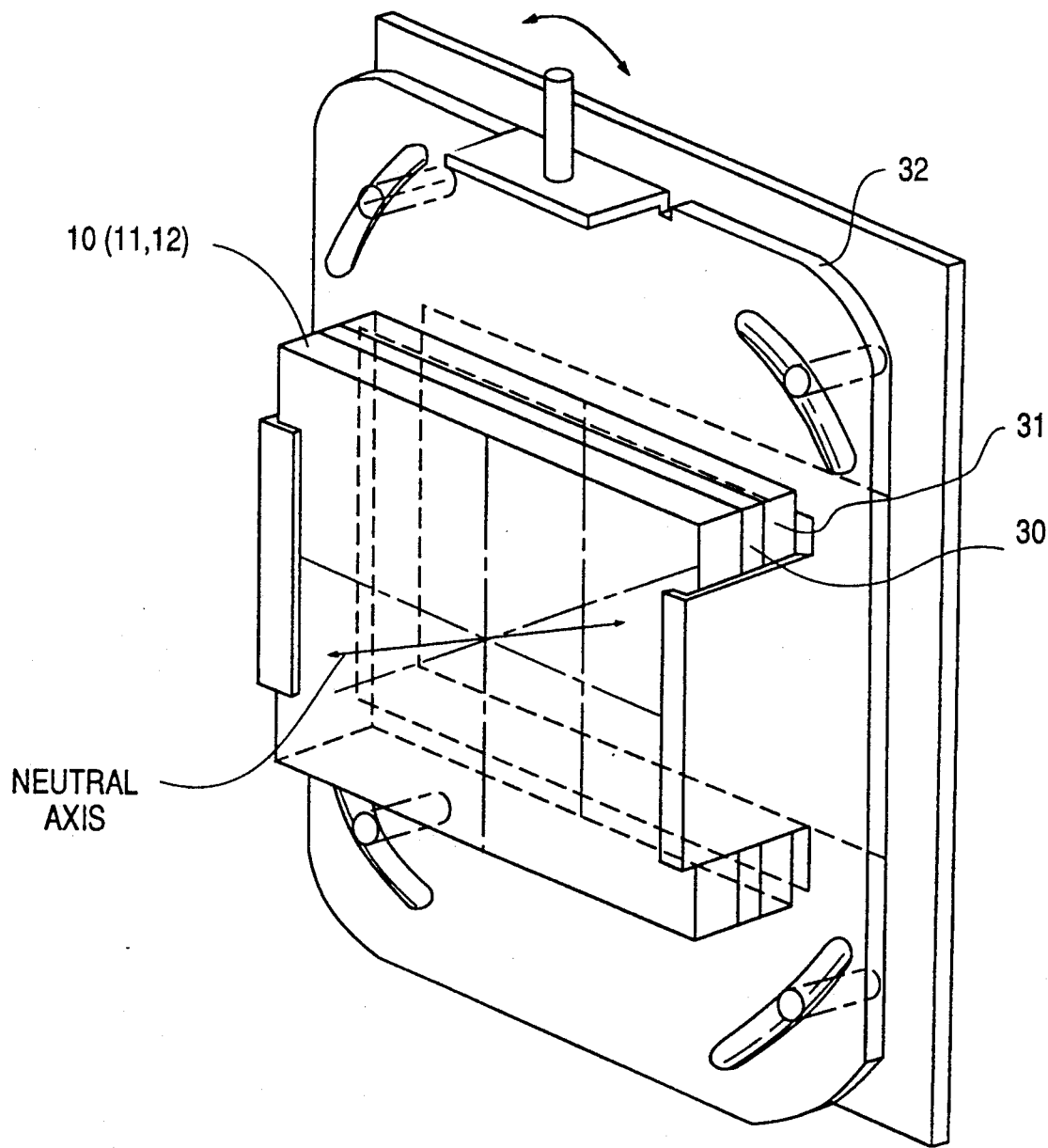
FIG. 2 is a rotational mechanism diagram of a halfwave plate.

A halfwave plate is generally used for inversion of circular polarization and elliptical polarization, or direction conversion of linear polarization. Each of the halfwave plates 10, 11, 12 is disposed so as to control the spectral distribution of color light of linear polarization entering the corresponding liquid crystal panel. As the halfwave plate, an inorganic optical single crystal wave plate, a drawn resin film wave plate, or a thin film wave plate may be used. The direction of two specific polarizations of the halfwave plate is the neutral axis. The wavelengths of the three halfwave plates 10, 11, 12 may be preferably set at the dominant wavelengths of the chromaticity of blue, green and red colors of the projected image depending on the wavelength of the entering color light, but in order to reduce the cost, all three halfwave plates may be set to have wavelengths around 550 nm. Since the inorganic optical monocrystal wave plate is high in the manufacturing cost, a wave plate composed of an inexpensive drawn resin film may be used. A rotation mechanism for the halfwave plate is shown in FIG. 2. An adhesive 30 is applied to one side of the halfwave plate 10 of a drawn resin film, and it is adhered to a flat glass plate 31. A rotating plate 32 is disposed on the flat glass plate 31, so that the neutral axis of the halfwave plate 10 may be rotated. The same holds true with respect to the halfwave plates 11, 12. Since intense light enters the halfwave plates 10, 11, 12, there is a problem of deterioration of the resin film due to heat. Hence it is necessary to cool the halfwave plates by air, liquid or the like. Instead of air or liquid cooling, a thin film wave plate of high heat resistance may be used. The thin film wave plate may be manufactured by making use of the phenomenon that briefringence is generated on the light beam vertically entering the film surface in an obliquely evaporated dielectric thin film. In the obliquely evaporated film, retardation may be set freely by adjusting the film thickness, or the evaporation time. Besides, it is possible to widen the area because film forming process is similar to that of other optical multilayer films.

The lights leaving the halfwave plates 10, 11, 12 enter three liquid crystal panels 16B, 16G, 16R of transmission type disposed on a same plane. Each of the liquid crystal panels 16B, 16G, 16R is composed by disposing polarizing plates 13, 15 at both sides of the liquid crystal cell 14 of twisted nematic mode in parallel Nicols. Each of the liquid crystal panels 16B, 16G, 16R is of active matrix type, and depending on a video signal applied thereto by the driving circuit 19, the transmittance of the light is changed in every pixel, whereby an optical image is formed. The optical images formed on the liquid crystal panels 16B, 16G, 16R are magnified and projected on the screen by three projection lenses 17B, 17G, 17R disposed mutually parallel on the optical axis, so that the blue, green and red projected images are combined on the screen 18. In order to combine the images formed by the three liquid crystal panels 16B, 16G, 16R on the screen 18, the two liquid crystal panels 16B, 16R, other than the middle position one of the three liquid crystal panels 16B, 16G, 16R are finely adjusted in the position and inclination on the plane with respect to the optical axes of the projection lenses 17B, 17R. The liquid crystal panels 17B, 17R may be fine-adjustably moved by using a spring or the like.

Figure 3:
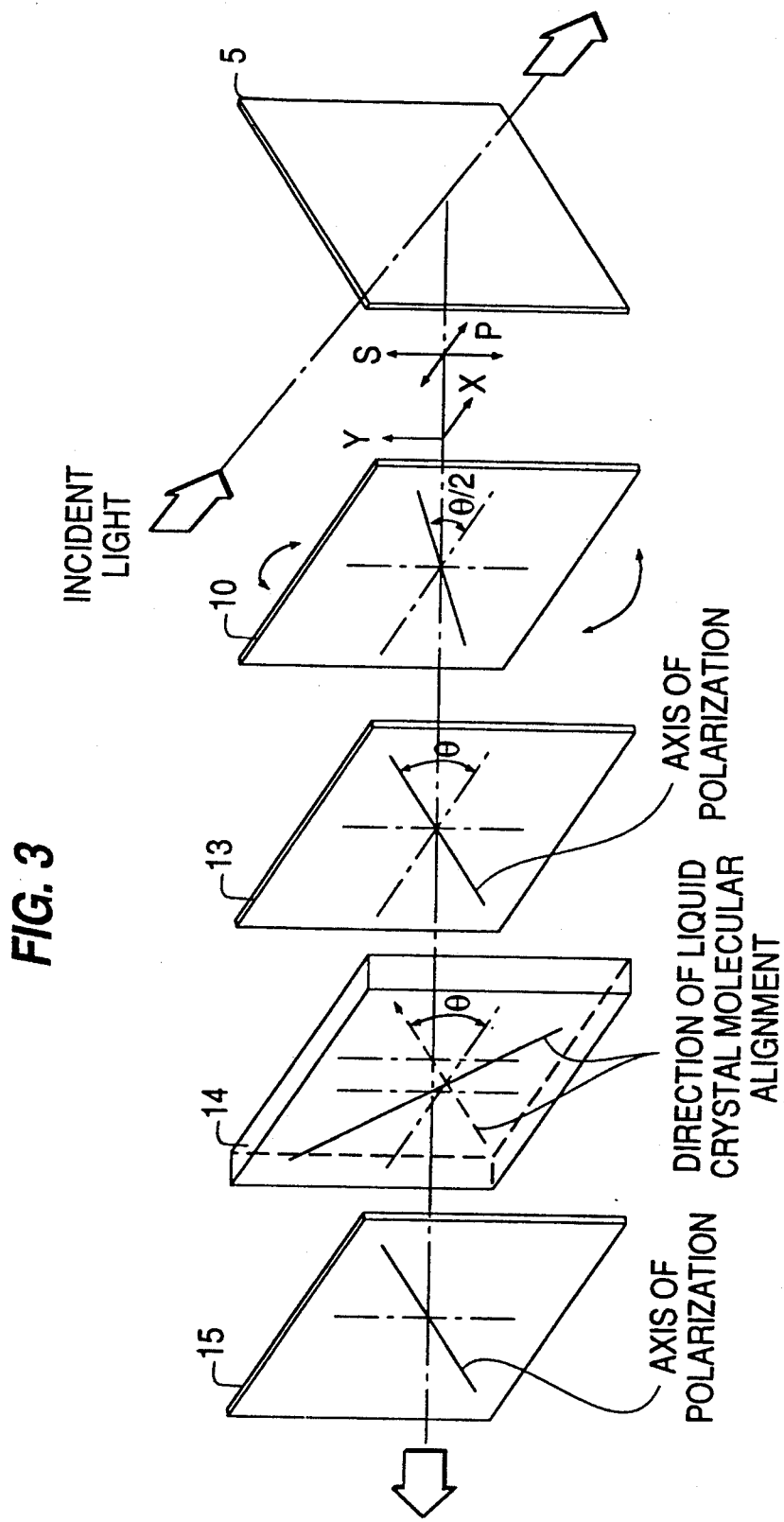
FIG. 3 is a status diagram of polarization direction of a halfwave plate and a liquid crystal panel.

FIG. 3 shows the state of polarization directions of dichroic mirror 5, halfwave plate 10, polarizing plates 13, 15, and liquid crystal cell 14. Here, the direction of the p-polarized light of the light reflected or transmitted by the dichroic mirror 5 is supposed to be x-direction, and the direction of the s-polarized light to be y-direction. The molecular alignment direction of the liquid crystal at each of the incident light side and exit light side wall surfaces of the liquid crystal cell 14 is approximately 45 degrees to the x-direction. Supposing the angle formed by the x-direction and the axis of polarization of the incident light side polarizing plate 13 to be θ (an acute angle), the halfwave plate 10 is disposed so that the angle formed by the neutral axis and the axis of polarization of the polarizing plate 13 may be θ/2. Generally, θ is selected around 45 degrees so that the transmittance characteristic on the screen of the liquid crystal panel 16B may be uniform, considering the transmittance characteristic with respect to the incident angle to the liquid crystal panel 16B. The halfwave plate 10 converts the direction of polarization so that the color light in the x-direction or the p-polarized light component may pass through the incident side polarizing plate 13, and a color light of the p-polarized light component is fed to the liquid crystal cell 14. Therefore, in the liquid crystal panel 16B, the color light of the p-polarized light component from the dichroic mirror 5 enters to form an optical image. Furthermore, by rotating the halfwave plate 10 by the rotating plate 32 shown in FIG. 2, the direction of polarization may be continuously controlled, so that the spectral distribution characteristic of the color light entering the liquid crystal panel 16B may be controlled in a range from the p-polarized light component to s-polarized light component.

Figure 4:
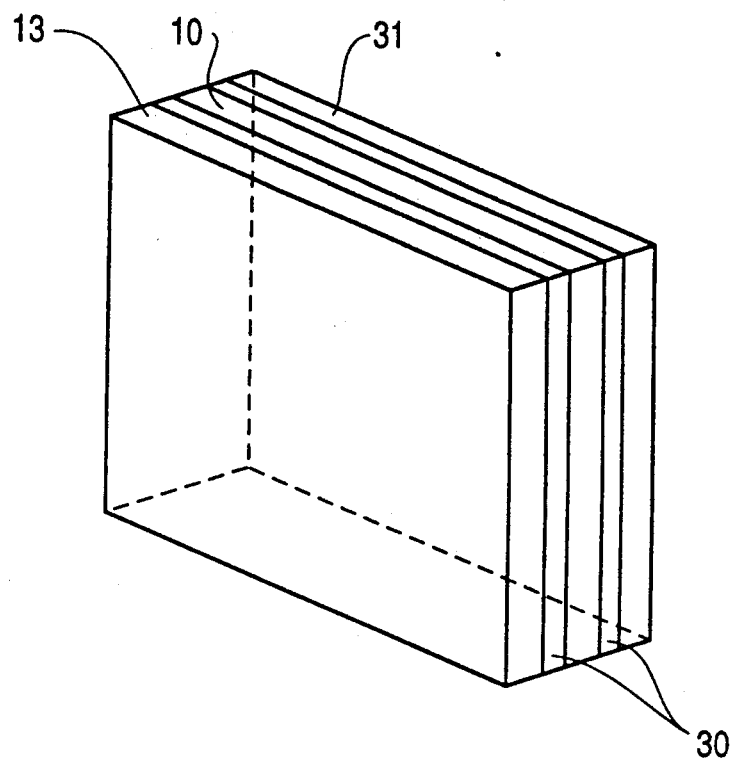
FIG. 4 is a gluing diagram of a halfwave plate and a polarizing plate.

In FIG. 1, meanwhile, the polarizing plate 13 and the halfwave plate 10 are separate from each other, but, as shown in FIG. 4, the polarizing plate 13 may be adhered to the halfwave plate 10 with an adhesive 30. The polarizing plate 13 and halfwave plate 10 are combined into one body, so that the positioning precision of the neutral axis of the halfwave plate 10 with the axis of polarization of the polarizing plate 13 may be enhanced. Since the halfwave plate 10 is provided with a rotating plate 32 as shown in FIG. 2, the contrast of the projected image can be adjusted by rotating the polarizing plate 13. The refractive index of the halfwave plate and polarizing plate may be 1.4 to 1.5. When the halfwave plate 10 and polarizing plate 13 are separate from each other, the light surface reflection loss would occur due to a difference in the refractive index on the boundary surface between the halfwave plate and air, and air and polarizing plate. When the halfwave plate 10 and polarizing plate 13 are glued tightly with the adhesive 30 with refractive index of 1.4 to 1.5, the surface reflection loss is reduced, and the light transmittance is raised. The same holds true for the halfwave plates 11, 12.

Figure 5:
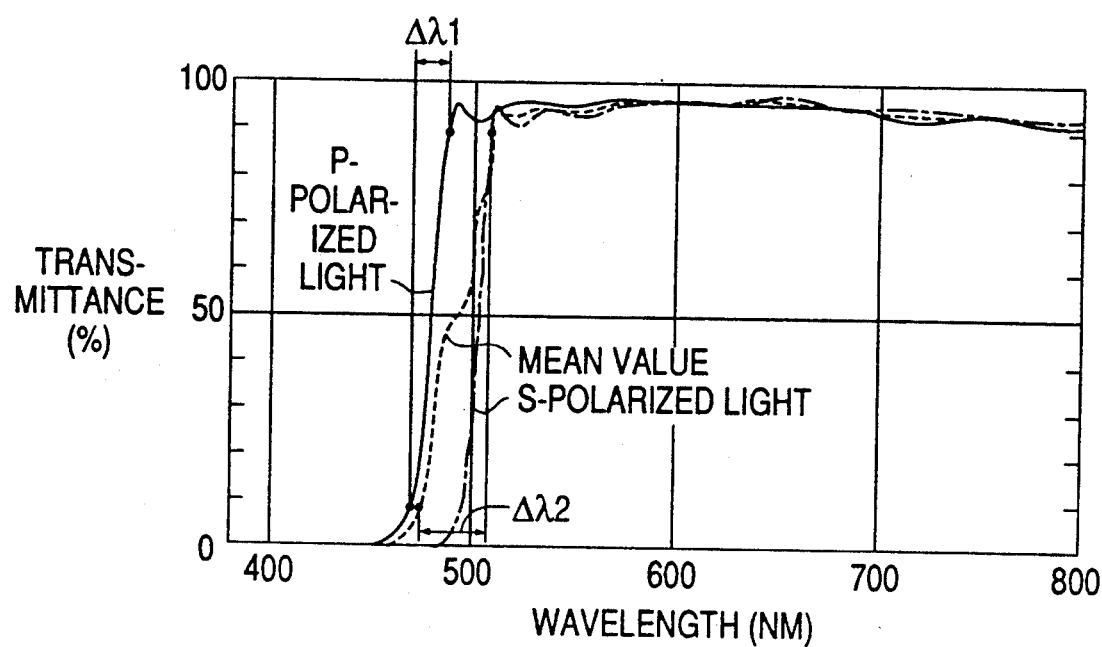
FIG. 5 is a spectral transmittance characteristic diagram of a dichroic mirror.

FIG. 5 shows a spectral transmittance characteristic of the dichroic mirror 5. In the diagram, the solid line denotes the p-polarized light component, the single-dot chain line represents the s-polarized light component, and the broken line is the characteristic of the mean component of p-polarized light and s-polarized light. The gradient width which is the difference between the wavelength when the transmittance is 10% and the wavelength when it is 90% is greater in $\Delta\lambda_2$ of the mean component than $\Delta\lambda_1$ of the p-polarized light component. The smaller the gradient width of the dichroic mirror 5, the smaller becomes the change of brightness and chromaticity of the color light on the liquid crystal panel 16B with respect to the change of the spectral transmittance of the dichroic mirror 24 due to incident angle dependence or film thickness nonuniformity. Besides, the smaller the gradient width, the higher becomes the color purity because the color is separated more sharply.

Since the light from the light source 3 is not a perfect parallel light, the incident angle of the light entering the dichroic mirror 5 varies depending on the location of the dichroic mirror 5. The greater the incident angle, the shorter wavelength side the spectral transmittance characteristic is shifted to, and when the incident angle is smaller, it is shifted to the longer wavelength side. Accordingly, the brightness and chromaticity of the color light emitted on the liquid crystal panel 16B change within the surface of the liquid crystal panel 16B, which may result in color nonuniformity of the projected image.

This change of the spectral transmittance due to incident angle into the dichroic mirror 5 is smaller in the color light of either one component of p-polarized light or s-polarized light than the color light of the mean component of p-polarized light and s-polarized light. Accordingly, the color nonuniformity of the projected image can be reduced by using either the p-polarized or s-polarized component. By rotating the halfwave plate 10, the color light in a range from the p-polarized light component to the s-polarized light component can be entered in the liquid crystal panel 16B, so that the chromaticity and brightness of the projected image can be adjusted. Therefore, if the spectral transmittance characteristic of the dichroic mirror 5 should fluctuate, the fluctuation can be corrected by the halfwave plates 10. As for the dichroic mirrors 6, 7, the halfwave plates 11, 12 provide similar effects. Since the brightness and chromaticity of the blue, green and red projected images can be finely adjusted, the white balance adjustment is easy.

Light in a wide band enters the halfwave plates 10, 11, 12, and therefore the tolerance of the set length of halfwave plate is very loose. If identical halfwave plates with the wavelength set around 550 nm are used as the halfwave plates 10, 11, 12 to which blue, green and red color light beam enter, the gradient width is slightly widened, and the brightness and chromaticity adjusting range varies somewhat, but there is no serious problem. Each of the halfwave plates 10, 11, 12 is disposed so that the color light of p-polarized light component may pass through the polarizing plate 13, but in FIG. 3, supposing the angle formed by the axis of polarization of the polarizing plate 13 and the y-axis to be $\phi$, the neutral axis of the halfwave plate is disposed so as to form an angle of $\phi/2$ to the y-axis, thereby permitting to pass the color light of the s-polarized light component.

Figure 6:
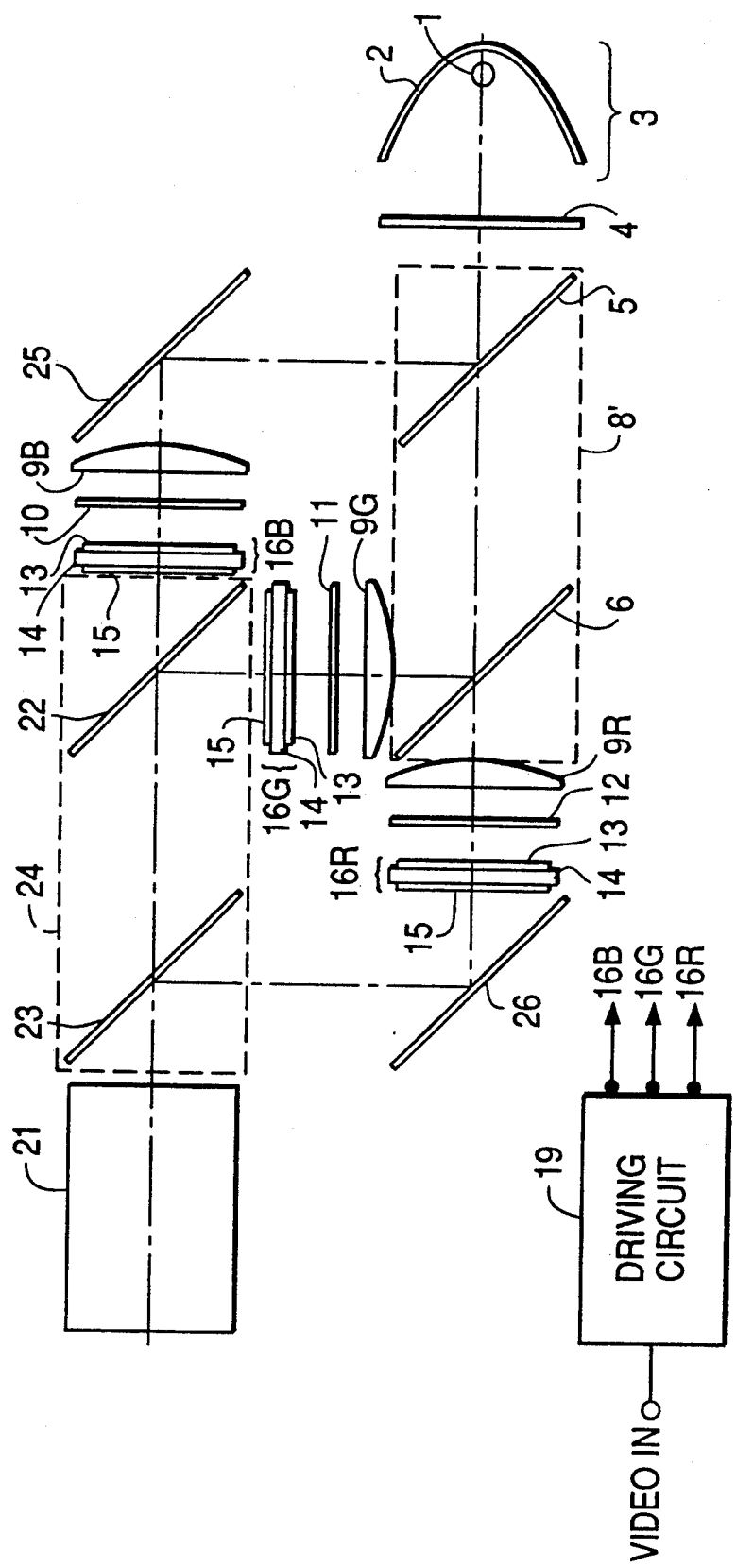
FIG. 6 is a configuration diagram of an image projection system in a second embodiment of the invention.

FIG. 6 shows a constitution of an image projection system according to a second embodiment of the invention. The light source 3, color separation optical means 8' composed of dichroic mirror 5 for blue reflection and dichroic mirror 6 for green reflection, field lenses 9B, 9G, 9R, halfwave plates 10, 11, 12, and liquid crystal panels 16B, 16G, 16R are the same as in the constitution in FIG. 1. What is different from FIG. 1 is that color combination means 24 composed of dichroic mirrors 22, 23, and one projection lens are employed.

The approximately parallel light from the light source 3 enters the ultraviolet, infrared ray cut filter 4 so that the ultraviolet ray and infrared ray may not be conducted to the front side, and is then sent into the color separation optical means 8'. The color separation optical means 8' separates the white light from the light source 3 into blue, green and red color light beams by means of the dichoric mirror 5 for blue reflection and dichoric mirror 6 for green reflection. The blue, green and red color light beams separated by the color separation optical means 8' pass through field lenses 9B, 9G, 9R, and enter the halfwave plates 10, 11, 12. The halfwave plates 10, 11, 12 control the spectral distribution of the color lights entering the liquid crystal panels 16B, 16G, 16R. The liquid crystal panels 16B, 16G, 16R receive the lights from the halfwave plates 10, 11, 12, and form optical images depending on the signals from the driving circuit 19. The lights from the liquid crystal panels 16B, 16G, 16R are combined in the color combination optical means 24 composed of dichroic mirror 22 for green reflection and dichroic mirror 23 for red reflection, and the combined light is magnified and projected by the projection lens 21. Same as in the first embodiment, by setting the direction of the neutral axis of the halfwave plate, the direction of polarization is converted so that the color light of the spectral characteristic of the p-polarized light component may pass through the polarizing plate 13. The color nonuniformity of the projected image may be decreased because the gradient width $\Delta \lambda$ is smaller than in the color light of the mean component of p-polarized light and s-polarized light and the change of spectral transmittance of the dichroic mirror with respect to the incident angle is smaller. Besides, since the halfwave plates 10, 11, 12 can be rotated by a rotating plate 32 as shown in FIG. 2, the liquid crystal panels 16B, 16G, 16R can make use of the color lights in a range from the p-polarized light component to s-polarized light component. Therefore, the brightness and chromaticity of the projected image can be adjusted. Besides, by forming the polarizing plate 13 and each of the halfwave plates 10, 11, 12 into one body as shown in FIG. 4, the polarizing plate 13 can be also rotated, so that the contrast of the projected image can be adjusted.

Each of the halfwave plates 10, 11, 12 may be disposed between exit side polarizing plate 15 of a corresponding one of the liquid crystal panels 16B, 16G, 16R and the color combination optical means. The light of linear polarization from the liquid crystal panel is converted in the direction of polarization by the halfwave plate into the p-polarization direction or s-polarization direction of the dichroic mirrors 22, 23, and enters the dichroic mirrors 22, 23. Therefore, the effect is the same as when the halfwave plates 10, 11, 12 are disposed between the color separation optical means 8' and the liquid crystal panels 16B, 16G, 16R.

Figure 7:
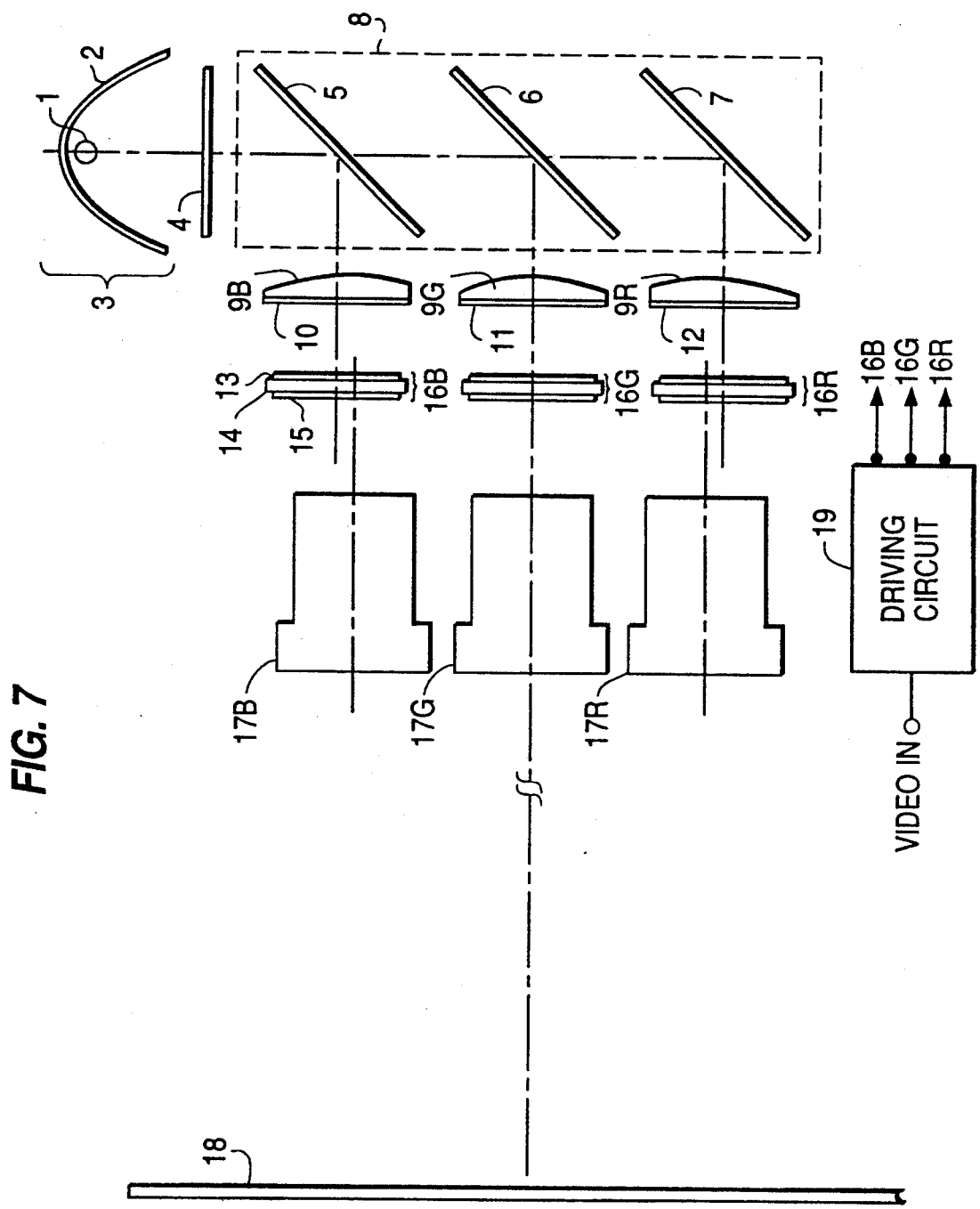
FIG. 7 is a configuration diagram of an image projection system in a third embodiment of the invention, and FIGS. 8 and 8' are diagrams showing a field lens rotation mechanism.
Figure 8:
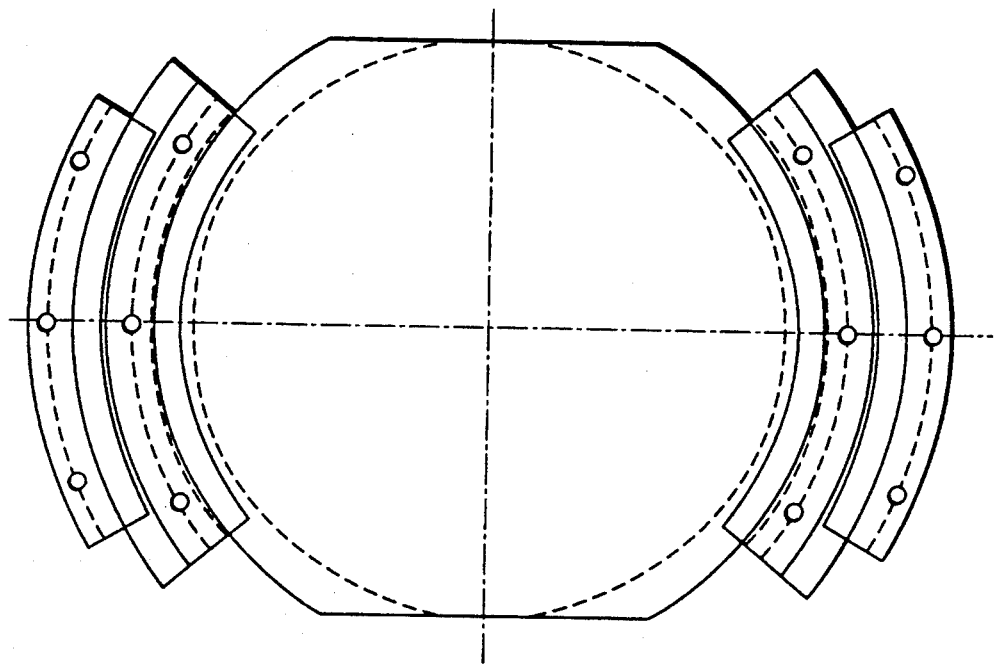
Figure 8:
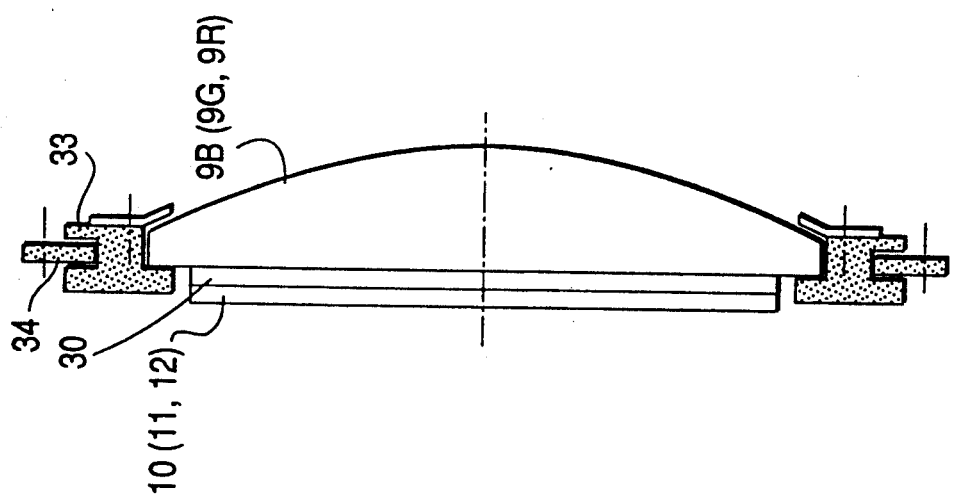

FIG. 7 shows a configuration of an image projection system in a third embodiment of the invention. What is different from the configuration of the projection system in the first embodiment is that the halfwave plates 10, 11, 12 are adhered tightly to the field lenses 9B, 9G, 9R, respectively, and that the field lenses 9B, 9G, 9R possess rotating means. The field lense with its rotation mechanism is shown in FIG. 8. The field lens 9B is fixed on a guide groove plate 33. The guide groove plate 33 can rotate along a support plate 34. Each of the field lenses 9B, 9G, 9R is a plano-concave lense with the plane side directed to a corresponding one of the liquid crystal panels 16B, 16G, 16R. An adhesive 30 is applied to one side of each of the halfwave plates 10, 11, 12, which is adhered to the plane side of a corresponding one of the field lenses 9B, 9G, 9R. The outer circumference of each of the field lenses 9B, 9G, 9R is circular or arc-shaped, so that the rotary mechanism can be mounted easily. By fitting the halfwave plate tightly to the field lense, the surface reflection loss between the field lens and air, and the air and the halfwave plate is reduced, so that the light transmittance can be enhanced. Besides, the support mechanism for the halfwave plates is not necessary.

Furthermore, when the polarizing plate 13 is fitted tightly to each of the halfwave plates 10, 11, 12, the polarizing plate 13 can be also rotated. Therefore, the contrast of the projected image can be adjusted. At the same time, the surface reflection loss on the boundary surface between the halfwave plates 10, 11, 12 and air, and the respective polarizing plates 13 and air may be reduced.

Also in the projection system shown in the second embodiment, similar effects are brought about when the halfwave plates are adhered to the field lenses.

In the foregoing embodiments, liquid crystal panels are used as light valves, but it is also possible to use light valves for forming optical images depending on a video signal as changes of the briefringence or optical rotation or other electro-optical effects.

Because of the halfwave plates, the gradient width of spectral distribution of color light entering the liquid crystal panels can be reduced, so that the changes of brightness and chromaticity due to changes of the spectral transmittance of the dichroic mirror owing to the incident angle dependence or film thickness nonuniformity can be made smaller. Besides, sharp color light separation or synthesis can be realized. Moreover, it is effective to reduce the color nonuniformity of the projected image due to changes of spectral transmittance characteristic of the dichroic mirrors with respect to the incident angle. By providing with means for rotating the halfwave plates, the spectral distribution characteristic of color light utilized by the liquid crystal panels can be adjusted, so that the brightness of the projected image or the color reproduction range can be adjusted.

What is claimed is:

1. A projection system comprising:
   a light source;
   color separation optical means for separating a light from the light source into blue, green and red color light beams;
   three halfwave plates receiving the blue, green and red color light beams from the color separation optical means for converting polarization directions of the color light beams;
   three light valves receiving light beams from the halfwave plates for forming optical images corresponding to a video signal; and
   three projection lenses for projecting on a screen light beams from the light valves to form an optical image on the screen.

2. A projection system of claim 1, which further comprises means for rotating the halfwave plates.

3. A projection system of claim 1, wherein each of the halfwave plates comprises a drawn resin film.

4. A projection system of claim 1, wherein each of the halfwave plates comprises a dielectric thin film formed on a glass substrate.

5. A projection system of claim 1, wherein each of the halfwave plates is provided with a polarizing plate.

6. A projection system comprising:
   a light source;
   color separation optical means for separating a light from the light source into blue, green and red color light beams;
   three light valves receiving the blue, green and red color light beams from the color separation optical means for forming optical images corresponding to a video signal;
   color combination optical means for combining blue, green and red color light beams emitted from the light valves;
   a projection lens for projecting on a screen an exit light from the color combination optical means to form an optical image on the screen; and
   halfwave plates disposed between the color separation optical means and color combination optical means for converting polarization directions of the blue, green and red color light beams.

7. A projection system of claim 6, which further comprises means for rotating the halfwave plates.

8. A projection system of claim 6, wherein each of the halfwave plates comprises a drawn resin film.

9. A projection system of claim 6, wherein each of the halfwave plates comprises a dielectric thin film formed on a glass substrate.

10. A projection system of claim 6, wherein each of the halfwave plates is provided with a polarizing plate.

11. A projection system comprising:
a light source;
color separation optical means for separating a light from the light source into blue, green and red color light beams;
three field lenses each having a halfwave plate formed thereon for receiving the blue, green and red color light beams from the color separation optical means;
three light valves receiving exit color light beams from the field lenses to form optical images corresponding to a video signal;
a projection lens for projecting on a screen the optical images; and
means for rotating the field lenses so as to adjust brightness and chromaticity of the projected image.

12. A projection system of claim 11, wherein the halfwave plate comprises a drawn resin film.

13. A projection system of claim 11, wherein the halfwave plate comprises a dielectric thin film formed on a glass substrate.

14. A projection system of claim 11, wherein the halfwave plate is provided with a polarizing plate.

15. A projection system of claim 11, wherein each of the field lenses is a plano-convex lens, and the halfwave plate is adhered by an adhesive to a plane surface of the plano-convex lens.

* * * * *